United States Patent Office 3,539,607
Patented Nov. 10, 1970

---

3,539,607
PREPARATION OF METHYLTRIETHYL LEAD
Theodore Psarras, Wilmington, Del., assignor to E. I. du Pont de Nemours and Company, Wilmington, Del., a corporation of Delaware
No Drawing. Filed Mar. 22, 1968, Ser. No. 715,150
Int. Cl. C07f 7/24
U.S. Cl. 260—437          4 Claims

ABSTRACT OF THE DISCLOSURE

Process for preparing particularly useful anti-knock component, methyltriethyl lead, by contacting tetraethyl lead with sodium and liquid ammonia under autogenous pressure at from about −10° C. to about 50° C. to form sodium triethyl plumbide; contacting the resulting reaction mass at the same temperature as above with methyl chloride under autogenous pressure; and recovering from the reaction mass methyltriethyl lead.

---

This invention relates to preparing a particularly useful gasoline antiknock component, methyltriethyl lead, and in particular to a process wherein tetraethyl lead is efficiently and economically converted to the methyltriethyl lead.

BACKGROUND

It is well known in the art to prepare tetramethylethyl lead blends, containing methyltriethyl lead, by the catalytic redistribution of mixtures of tetramethyl lead and tetraethyl lead. For example, when a mixture of 1 molar proportion of tetramethyl lead and 3 molar proportions of tetraethyl lead is catalytically redistributed, there results a well known commercial blend of tetramethylethyl leads comprising:

| Tetramethylethyl leads: | Mole percent composition |
|---|---|
| Tetramethyl lead | 0.1 |
| Trimethylethyl lead | 3.3 |
| Dimethyldiethyl lead | 19.5 |
| Methyltriethyl lead | 49.5 |
| Tetraethyl lead | 27.6 |

In the particular blend above, there is, on the average, about 1 methyl-to-lead bond and about 3 ethyl-to-lead bonds for each atom of lead. Thus, the blend has about the same methyl to ethyl ratio as does methyltriethyl lead, although the blend contains only 49.5 mole percent of methyltriethyl lead per se. It has also been determined that the commercial blend above and methyltriethyl lead are comparably effective as gasoline antiknock components. The art does not, however, disclose a practical process for preparing substantially pure methyltriethyl lead. However, an atmospheric pressure, liquid ammonia procedure is known for preparing alkyltriethyl leads, wherein the alkyl is neither methyl nor ethyl. In this synthesis tetraethyl lead is contacted with sodium in liquid ammonia at temperatures as low as −70° C. There results sodium triethyl plumbide in the liquid ammonia. If an alkyl halide is added to this plumbide solution an alkyltriethyl lead is produced.

This atmospheric pressure synthesis has important, practical disadvantages, namely:

(1) It provides for producing such products as n-butyltriethyl lead, sec-butyltriethyl lead, benzyltriethyl lead or allyltriethyl lead. None of these organotriethyl leads is of nearly the commercial importance of methyltriethyl lead;

(2) This atmospheric pressure synthesis does not utilize easily available and relatively inexpensive methyl chloride as an alkylating agent for the sodium triethyl plumbide; and (3) Elaborate and costly means of insulation and refrigeration would be required for any commercial reactor to prevent escape of toxic and commercially important quantities of gaseous ammonia to the atmosphere.

It is accordingly among the objects of this invention to provide a practical process for methyltriethyl lead.

Another object is such a process wherein methyl chloride is used to alkylate sodium triethyl lead to produce methyltriethyl lead.

A third object is such a process conducted in liquid ammonia under sufficient pressure to contain the ammonia at temperatures above the atmospheric pressure boiling point of ammonia.

BRIEF SUMMARY OF THE INVENTION

These and other objectives are attained according to the present invention by a process for preparing methyltriethyl lead by:

(A) Contacting, preferably under agitation, tetraethyl with at least about 2.2 moles of sodium (preferably about 2.2 to 3.0 moles) per mole of tetraethyl lead and sufficient excess liquid ammonia to give a stirable reaction mass (preferably about 12 to about 25 moles per mole of tetraethyl lead) under autogenous pressure at from about −10° C. to about 50° C. (preferably 10–40° C.) to form sodium triethyl plumbide;

(B) Then contacting, preferably under agitation, the reaction mass from A at from about −10° C. to about 50° C. (preferably 10–40° C.) under autogenous pressure with at least about 2.2 moles of methyl chloride (preferably about 2.2–5 moles) per mole of tetraethyl lead to form methyltriethyl lead; and (C) Recovering the methyltriethyl lead from the reaction mass of B (and, optionally, recovering excess ammonia, excess methyl chloride and the by-product methyl amine).

Step A is performed for a time sufficient to convert a substantial portion of the tetraalkyl lead to the plumbide (preferably until at least about 90 mole percent of the lead is converted). Likewise, step B is preferably performed until a substantial portion (at least about 90%) of the plumbide is converted to methyltriethyl lead.

DETAILED DESCRIPTION OF THE INVENTION

The following equations illustrate the process of the invention:

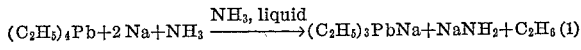

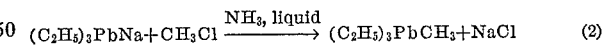

Equation 1 shows the formation of sodium triethyl plumbide and formation of sodamide and ethane as by-products. Equation 2 illustrates the formation of methyltriethyl lead and Equation 3 shows the fate of the by-product sodamide, i.e., in methylamine formation.

Reactors and their use in this process

Many pressure reactors from small steel laboratory bombs to steel or stainless steel commercial pressure reactors are suitable for the process of this invention. Pressures to be encountered in such reactors at from about −10° C. to about 50° C. will be due mainly to the autogenous vapor pressure of liquid ammonia. Such pressures are quite moderate and easily within design specifications of many well known types of pressure reactors. For example, between −10° C. and 50° C. the absolute vapor pressure of liquid ammonia varies from approximately 2 to 20 atmospheres and for methyl chloride from about 1.5 to 10 atmospheres. Many pressure reactors are designed to operate at such pressures and even at pressures considerably greater.

Inasmuch as the reaction mass in such a reactor will be inhomogeneous, agitation of the mass will be highly desirable. Means of agitating small bombs usually comprise mechanical shaking. Reactors such as commercial autoclaves are frequently agitated by blades or paddles.

Since all the reactions of this process can be exothermic, especially in the presence of traces or impurities such as iron compounds, a means of measuring reaction mass temperature is desirable. Likewise, some means of cooling the reaction mass may be required, especially in commercial scale operation. It will be appreciated that this process is operable at $-10°$ C. and even at lower temperatures and at temperatures of 80 to $90°$ C., i.e., temperatures approaching the thermal decomposition temperature (near $100°$ C.) of tetraethyl lead. The preferred operating range is, however, from about $10°$ C. to about $40°$ C. It is in this preferred range that cooling costs are minimized. Usual industrial water supplies would furnish cooling water at suitable temperatures for cooling reactor contents. Neither refrigeration nor heating of such water would normally be required.

It will be further appreciated that any such reactor be provided with sealable openings through which reagents are added and products, excess reagents and by-products are removed.

Embodiment

In an embodiment of this invention, a reactor as described above is charged with tetraethyl lead and with from about 2.2 to 3 moles of sodium per mole of the tetraethyl lead. The reactor is then sealed and agitation is initiated. From about 12 to about 25 moles (per mole of the tetraethyl lead) of anhydrous liquid ammonia is charged into the reactor through one of the sealable openings. Agitation is continued and cooling is applied as required to keep reactor contents between the $-10°$ C. and $50°$ C. range, and most preferably at between 10 and $40°$ C.

Means of adding liquid, toxic tetraethyl lead to a reactor in preselected quantities are well known in the art. The sodium may be added by any suitable means minimizing the exposure of the sodium to moisture or oxygen in the air, and providing for the addition of the desired quantity of sodium. The desired quantity of liquid ammonia may be piped in a line from a liquid ammonia storage tank and then admitted by valve to the sealed vessel under autogenous ammonia pressure or by pumping. The quantity of ammonia may be controlled by addition from a so-called weigh-tank or by means of a precalibrated flow meter in the ammonia line. Agitation is continued until a major proportion of the tetraethyl lead is converted to sodium trimethyl plumbide (preferably at least 90 mole percent). Reaction completion may be ascertained by determining when ethane content is at a maximum in vapor samples removed periodically from the vapor space of the reactor. The ethane content of a vapor sample may be measured by means of a previously calibrated vapor phase chromatograph.

Next, from about 2.2 moles to about 5 moles (per mole of the original tetraethyl lead) of methyl chloride are admitted to the reactor by a suitable means such as pumping liquid methyl chloride through a precalibrated flowmeter into the reactor. Methyl chloride addition rate and extrenal cooling may be balanced to provide both a practically rapid reaction rate and control of reaction temperature in the desired range. Agitation is maintained until a major portion (at least about 90 mole percent) of the triethyl plumbide is converted to methyltriethyl lead. The completeness of this conversion may be determined by periodic analyses of samples of vessel liquid contents by vapor phase chromatography.

Upon substantial completion of methyltriethyl lead formation, volatile reactor contents are pumped to a suitably constructed pressure still for separation and recovery of excess ammonia, methyl chloride and by-product methyl amine. Ethane may be vented to the atmosphere from the still head. When the pumping has reduced the internal pressure of the reactor to approximately atmospheric pressure, the reactor contents comprise methyltriethyl lead, sodium chloride and unreacted sodium. The methyltriethyl lead may be recovered by any suitable means. One such recovery means comprises adding sufficient ethanol, n-propanol, isopropanol or like lower alcohol to destroy any residual sodium and, then, drowning the reaction mass in excess water, allowing the methyltriethyl lead and aqueous layers to separate, and separating the methyltriethyl lead layer from the aqueous layer. Alternatively, after destroying any residual sodium, the methyltriethyl lead may be recovered by extracting the reaction mass with any suitable solvent for methyltriethyl lead, e.g., with benzene, toluene, xylene or the like.

In the foregoing embodiment the limits shown for reagent quantities are practical limits. Enough liquid ammonia must be present to afford a fluid reaction mass. Excess ammonia would be wasteful of reactor space. Equation 1 above indicates that at least 2 moles of sodium are required for each mode of tetraethyl lead used. 2.2 moles of sodium provide for a faster reaction rate and also provide some extra sodium to react with any residual traces of water or oxygen in the reactor. More than 3 moles of sodium are unnecessary and may provide hazardous conditions during product recovery. Hydrogen is produced when the alcohol contacts the residual sodium. Minimizing hydrogen production by minimizing residual sodium constitutes a practical safety step. Equations 2 and 3 above require 2 moles of methyl chloride per mole of methyltriethyl lead. A little more than 2 moles of methyl chloride, e.g., 2.2 moles are desirable for practical reaction rate; more than 5 moles serve no useful purpose.

The ratio of charge volume to reactor volume also has practical limits. The reactor must never be liquid full, but too little charge is wasteful of production space and may permit so much liquid ammonia to vaporize that too little fluid reaction mass remains for efficient agitation.

EXAMPLES

The following examples are intended to be merely illustrative of the invention and not in limitation thereof. Parts are by weight unless otherwise indicated.

Example 1

To an oven-dried, steel laboratory bomb of about 20 parts water capacity, fitted with a needle valve for adding liquids or gases and a thermocouple for determining reaction mass temperature, are added 3.4 parts (0.01 mole) of tetraethyl lead and 0.6 part (0.026 mole) of sodium as freshly prepared wire cut into pieces about 2 mm. in diameter and about 1 cm. long. The bomb is then sealed and evacuated through the needle valve by means of a vacuum pump. Next, 3 parts (0.18 mole) of ammonia are added, under autogenous ammonia pressure, via the needle valve to the bomb and the bomb agitated for about 20 minutes. During the agitation period, reaction mass temperature rises to about $43°$ C. and then falls to about 25 to $27°$ C. After the 20 minute agitation period, agitation is stopped and the bomb is vented until internal pressure reaches atmospheric pressure. Next, 1.5 parts (0.03 mole) of methyl chloride are added to the bomb under autogenous methyl chloride pressure. The valve is closed and the bomb agitated for 30 minutes. During agitation, internal temperature rises from about $25°$ C. to about $35°$ C. and then returns to about $25°$ C. After the 30 minute agitation, the bomb is vented down to atmospheric pressure and opened. The bomb contents are treated with isopropanol and then with excess water. The water treated bomb contents are extracted with toluene and aliquots of the toluene, extract are analyzed, Analysis by iodine titration indicates a 90 mole percent recovery of tetraalkyl leads, based on the amount of the original tetraethyl lead.

Analysis by vapor phase chromatography shows that the product is methyltriethyl lead containing about 10 mole percent of other tetramethylethyl leads, mostly dimethyldiethyl lead. Thus, the process produces methyltriethyl lead and also affords some minor amounts of redistribution products.

Example 2

In an experiment conducted substantially as in Example 1, 4.1 parts (0.03 mole) of n-butyl bromide are substituted for the 1.5 parts of methyl chloride. Tetraalkyl lead recovery is 69 mole percent and the recovered product is composed of about 80 mole percent n-butyltriethyl lead and about 20 mole percent unreacted tetraethyl lead.

Substantial quantities of solid by-product are isolated from the reaction mass. Upon treatment with excess water the by-product remains unaffected, indicating that it is not sodamide.

In the following example, the process of this invention is conducted at a temperature intermediate between the room temperature (about 25° C.) process of Example 1 and the atmospheric pressure boiling points of liquid ammonia, −33° C., and methyl chloride, −24° C.

Example 3

A bomb as described in Example 1 charged at −10° C. with 0.6 part (0.026 mole) of sodium wire pieces, 3.3 parts (0.01 mole) of tetraethyl lead and 3.5 parts (0.21 mole) of liquid ammonia. The bomb is then shaken for 20 minutes at −10° C. in a thermostatically controlled refrigerated bath. Agitation is then stopped and 1.2 parts (0.024 mole) of liquid methyl chloride are fed through the valve into the bomb under an argon pressure of 12.3 kg. per cm.$^2$ gauge pressure. Agitation at −10° C. is resumed and maintained for an additional 30 minutes. The bomb is allowed to warm to room temperature, then vented down to atmospheric pressure and opened. Analyses, as in Example 1, indicate a 92 mole percent alkyl lead recovery and a product comprising methyltriethyl lead containing about 12 mole percent of other tetramethylethyl leads.

The results of the foregoing examples especially demonstrate the effective production of methyltriethyl lead in a pressure reactor at temperature substantially above the atmospheric boiling point of liquid ammonia. Surprisingly, n-butyl bromide proves to be a substantially poorer alkylating agent for the triethyl plumbide than methyl chloride.

The results further indicate that the process is applicable for preparing methyltriethyl lead over a wide temperature range. One is, therefore, led to employ a preferred temperature range, viz., about 10 to about 40° C., wherein temperature control is most economical.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. A process for preparing methyltriethyl lead comprising:
    (A) contacting with agitation tetraethyl lead with at least about 2.2 moles of sodium per mole of said tetraethyl lead and with sufficient excess liquid ammonia to give a stirable reaction mass at from about −10° C. to about 50° C., under autogenous pressure and substantially anhydrous conditions, to form sodium triethyl plumbide;
    (B) then contacting with agitation the reaction mass from A under autogenous pressure and substantially anhydrous conditions at from about −10° C. to about 50° C. with at least about 2.2 moles of methyl chloride per mole of tetraethyl lead to form methyltriethyl lead; and
    (C) recovering the methyltriethyl lead from the reaction mass from B.
2. A process for preparing methyltriethyl lead comprising:
    (A) contacting with agitation tetraethyl lead with from about 2.2 to about 3.0 moles of sodium per mole of tetraethyl lead and with from about 12 to about 25 moles of liquid ammonia per mole of tetraethyl lead under autogenous pressure and substantially anhydrous conditions at from about −10° C. to 50° C. for a time sufficient to convert a substantial proportion of said lead to sodium triethyl plumbide;
    (B) contacting with agitation the reaction mass from A at from about −10° C. to about 50° C. with from about 2.2 to about 5.0 moles of methyl chloride per mole of tetraethyl lead under autogenous pressure and substantially anhydrous conditions for a time sufficient to convert a substantial proportion of said plumbide to methyltriethyl lead; and
    (C) recovering the methyltriethyl lead from the reaction mass of B.
3. Claim 2 wherein steps A and B are conducted at between 10° C. and 40° C.
4. Claim 3 further comprising recovering from the reaction mass of step B excess ammonia, excess methyl chloride and the by-product methyl amine.

References Cited

UNITED STATES PATENTS 3,088,920   5/1963   Palfrey et al. ____ 260—437 XR

OTHER REFERENCES

Holliday et al., J. Chem. Soc. (London) pp. 3485–87 (1958).

Bindschadler, J. of Science, Iowa State College, vol. 16, (1941) pp. 33 to 36.

Gilman et al., J. Org. Chem., vol. 16, pp. 466, 467 and 472 (1951).

Foster et al., J. Amer. Chem. Soc., vol 61, pp. 1685 to 87 (1939).

Gilman et al., J. Org. Chem., vol. 18, pp. 1675–78 (1953).

TOBIAS E. LEVOW, Primary Examiner

H. M. S. SNEED, Assistant Examiner